United States Patent [19]
Karubian et al.

[11] Patent Number: 5,441,445
[45] Date of Patent: Aug. 15, 1995

[54] DE-HIDING TOOL

[75] Inventors: Ralph K. Karubian, Los Angeles, Calif.; Thomas G. Surman, West Point, Nebr.

[73] Assignee: Kentmaster Manufacturing Company, Inc., Monrovia, Calif.

[21] Appl. No.: 196,410

[22] Filed: Feb. 15, 1994

Related U.S. Application Data

[63] Continuation-in-part of Ser. No. 119,435, Sep. 9, 1993, abandoned.

[51] Int. Cl.6 ............................................. A22B 5/16
[52] U.S. Cl. .................................. 452/133; 30/219
[58] Field of Search .................. 452/133, 125; 30/219

[56] References Cited

U.S. PATENT DOCUMENTS

| | | | |
|---|---|---|---|
| 2,547,134 | 4/1957 | McLean | 452/133 |
| 4,368,560 | 1/1983 | Wetzel et al. | 452/133 |
| 4,901,400 | 2/1990 | Karubian | 452/133 |
| 5,122,092 | 6/1992 | Abdul | 452/133 |

FOREIGN PATENT DOCUMENTS

| | | | |
|---|---|---|---|
| 1321829 | 5/1962 | France | 452/125 |
| 952723 | 11/1962 | United Kingdom | 452/125 |

*Primary Examiner*—Willis Little
*Attorney, Agent, or Firm*—Christie, Parker & Hale

[57] ABSTRACT

A de-hiding tool includes a handle section with a long blade cover, a pair of counter-rotating and oscillating cutting disks mounted face-to-face and driven by eccentrically mounted drive arms operated by a self-contained air motor, a short blade cover mounted to a side of the cutting disks opposite from the long blade cover, and an adjustable blade support which includes an adjustment shaft extending through the blade covers and providing a means for adjusting the spacing between the blade covers from the outside of the tool housing. The blade adjustment system includes an insert with threads accessible from the outside of the housing to adjust the size of a gap between the blades by corresponding movement of a spacer inside the cover. This controls the face-to-face pressure on the blades to make them cut more efficiently and to compensate for the blades being ground thinner when resharpening the blades.

12 Claims, 11 Drawing Sheets

DE-HIDING TOOL

CROSS-REFERENCE

This is a continuation-in-part of application Ser. No. 08/119,435, filed Sep. 9, 1993 abandoned.

FIELD OF THE INVENTION

This invention relates to equipment for use in slaughterhouses, and more particularly, to a de-hiding tool for use in separating the hide of an animal from its carcass.

BACKGROUND

Tools for de-hiding carcasses are well-known in the industry, and various improvements to de-hiding tools are disclosed in U.S. Pat. Nos. 4,368,560 to Wetzel et al., 5,122,092 to Abdul, and 4,901,400 to Karubian. Generally speaking, these tools have oppositely reciprocating cutting blades which are usually disk-shaped with serrated outer edges. The blades are driven by an air motor at very high speeds, in one embodiment approximately 6,500 rpm.

It is important to minimize the amount of waste material that tends to collect between the blades during use in order to avoid the tool becoming unsanitary and inefficient in its cutting. To confront this problem, the blades in prior art de-hiders are put under face-to-face pressure by various spring mechanisms that press one blade face against the other. As these blades reciprocate in opposite directions each to the other, friction and wear are developed by the spring element. Some prior art de-hiders have used a wave spring that becomes worn and fails due to fatigue under the high speed operating conditions that exist. Replacement of the wave spring is expensive and time consuming, and with the devices of the prior art it must occur quite frequently. The present invention provides an improvement to the techniques for maintaining face-to-face pressure contact on the blades during use.

There is also a need to develop a de-hiding tool having reduced weight and which minimizes noise and vibration during use. One prior art de-hiding tool, such as that disclosed in my '400 patent, uses an integral handle and blade-supporting frame made of aluminum to reduce weight. This design includes three spaced apart holes on the frame for receiving fastening devices for attaching the blades to the drive arms and to a cover secured to the outside of the tool housing. During use, the tool is constantly being twisted manually, which applies substantial lateral forces that flex the cutting blades. As a result, the frame of the tool where the holes are located was prone to cracking or breaking.

A subsequent design that was intended to overcome this problem replaced the aluminum frame with a handle and blade cover made of steel, using a center insert-type bearing as a spacer for mounting the cutting blades inside the housing cover. This tool mounts the blades to a cantilevered supporting shaft contained inside the blade covers. Because of the mounting arrangement of the blade supporting shaft, the shaft has been prone to cracking or breaking under the lateral forces applied to the blades during use.

There is also a need to improve cutting efficiency and to reduce the time lost when the tool is disassembled for sharpening the blades. As the blades become dull during use, the tool must be disassembled and the blades reground, typically by a hollow grinding process. Each time the blades are reground they become thinner. Eventually this creates a problem of the confronting blade faces being spaced so far apart that their cutting efficiency is reduced, in a manner similar to scissor blades that are spaced too far apart. The past systems for maintaining pressure on the confronting faces of the blades are not only subject to wear and breakage problems, but they do not adequately solve the problem of compensating for the thinner blades that result from the regrinding process.

Thus, there is a need to improve the wear life of the blade support system, to maintain cutting efficiency over a longer period of time, to reduce the time lost in reconditioning the cutting blades, and to reduce the adverse effects of vibration and the weight of the tool during use. There is also a need for a blade adjustment system that can be efficiently used to readily make adjustments to compensate for blade wear.

SUMMARY OF THE INVENTION

The present invention provides a de-hiding tool having a blade spacing adjustment and blade pressure applying system that improves cutting efficiency and, as a result, greatly reduces downtime required for reconditioning the cutting blades. In addition, the de-hiding tool includes an improved support system for the cutting blades, resulting in greater wear resistance, avoidance of tool breakage, and reduced vibration. As a result of the invention, the tool can be used by applying normal levels of twisting and leverage or lateral flexing to the blades because of the tool's enhanced structural integrity. The tool also includes an adjustment system that can be easily used to make adjustments for blade wear.

Briefly, one embodiment of the de-hiding tool includes an elongated handle section containing an air motor for reciprocating drive arms coupled to a pair of oscillating, counter-rotating disk-like cutting blades. The blades are supported inside a pair of blade covers secured in a fixed position above the handle section of the tool. The cover sections have confronting inside faces on opposite sides of a gap in which the blades are mounted. The blade covers rigidly support a blade supporting shaft that mounts the blades for operation within the gap between the blade covers. A blade spacer bushing carried on the supporting shaft supports the blades on the shaft. The spacer bushing controls the width of the gap. The blade supporting shaft is adjustable entirely from the exterior of the blade covers to control the effective width of the spacer bushing and simultaneously control the pressure applied by the blade covers to the outer faces of the blades mounted in the gap. In one embodiment, the supporting shaft can be adjusted from the exterior of the blade covers to move the spacer bushing into an undercut space within one of the blade covers so as to shorten the bushing's effective width and thereby narrow the gap in which the blades are mounted between the blade covers. The blade supporting shaft also includes an adjustment device to control the pressure applied by the blade covers to the blades when the blade covers have been moved to the adjusted narrowed position.

Thus, during use, when the blades are subject to wear, or the blades are hollow ground to sharpen the cutting edges, which results in a thinning of the blades, the reduced blade thickness can be compensated for by the adjustment in the width of the gap while at the same time adjusting the pressure on the blade faces to maintain cutting efficiency.

In one embodiment of the invention, the blade covers provide the sole means of supporting the blade supporting shaft which is rigidly supported at both ends within openings leading to the exterior of the blade covers. The blade supporting shaft, being rigidly supported at both ends while at the same time being supported entirely by the mass of the blade covers, provides a stable bridge-like means of support that avoids the structural problems of the blade support systems characteristic of the prior art.

A further embodiment provides a blade adjustment system in which the width of the gap in which the blades are mounted can be adjusted entirely from the exterior of the blade cover plates, with the adjustments in gap width and blade pressure being made from one side of the tool.

These and other aspects of the invention will be more fully understood by referring to the following detailed description and the accompanying drawings.

DETAILED DESCRIPTION

Figure 1:
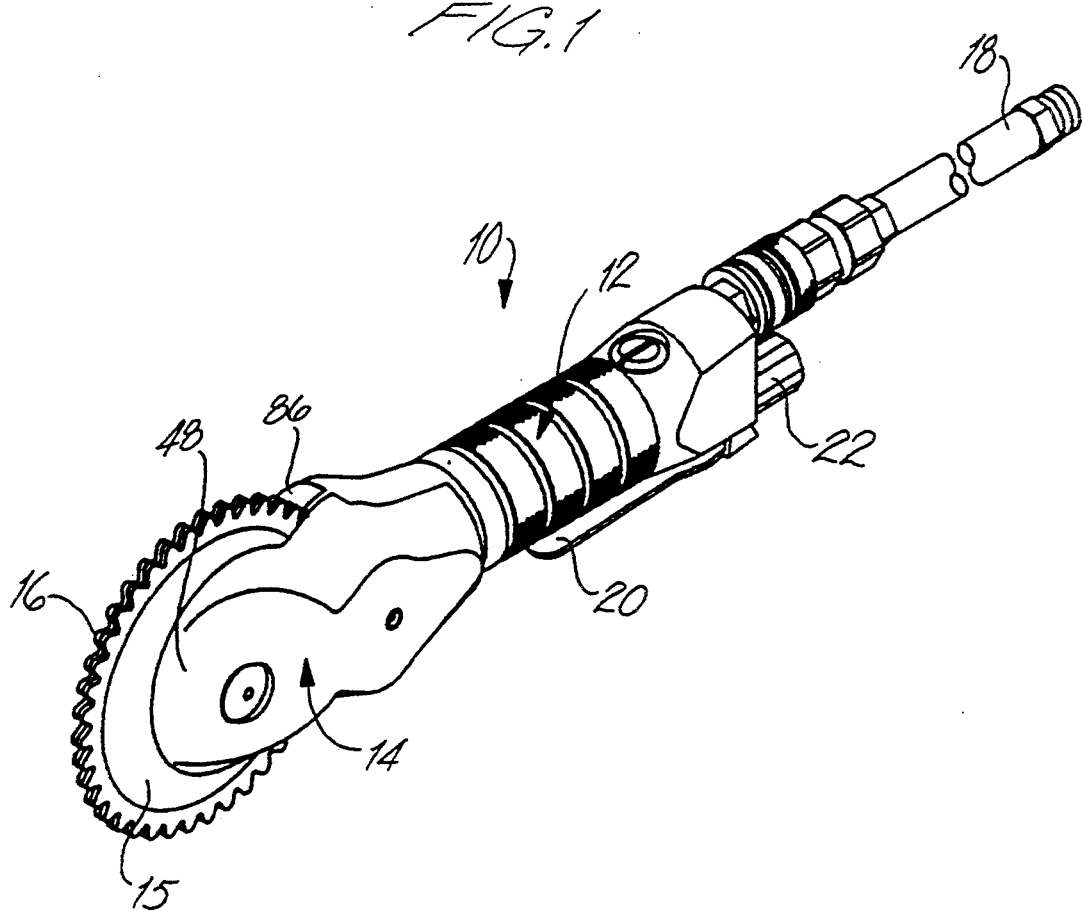
FIG. 1 is a perspective view showing a de-hiding tool according to principles of this invention.

FIG. 1 is a perspective view showing a hand-held de-hider 10 which includes an elongated handle section 12 containing an air motor, and a blade housing 14 affixed to the handle above the air motor. A pair of disk blades 15 and 16 with serrated outer blade edges are mounted in the blade housing and driven by the air motor. The bottom of the handle section includes a pneumatic fitting 18 for connecting to an air inlet hose from a source of air under pressure. A normally closed air valve contained internally within the handle section is controlled by an exterior lever arm 20 carried on the handle. Manually applied pressure to actuate the lever arm releases the valve and transmits air under pressure to the air motor for rotating the cutting blades at high speed. An exhaust fitting 22 carried on the bottom of the handle section directs exhaust air away from the drive motor.

The blades are mounted face-to-face in the blade housing and are driven in opposite directions by corresponding lever arms contained internally within the drive housing. The lever arms are eccentrically driven to cause the cutting disks to reverse their directions of rotation and also to rotate with opposing oscillations that cause the cutting teeth on the disks to cut with a scissors action. This arrangement for oscillating the cutting blades in opposite directions under high speed with a scissors cutting action is well known in the art and is described, for example, in U.S. Pat. Nos. 5,122,092 to Abdul, 4,368,560 to Wetzel et al., and 4,901,400 to Karubian.

Figure 2:
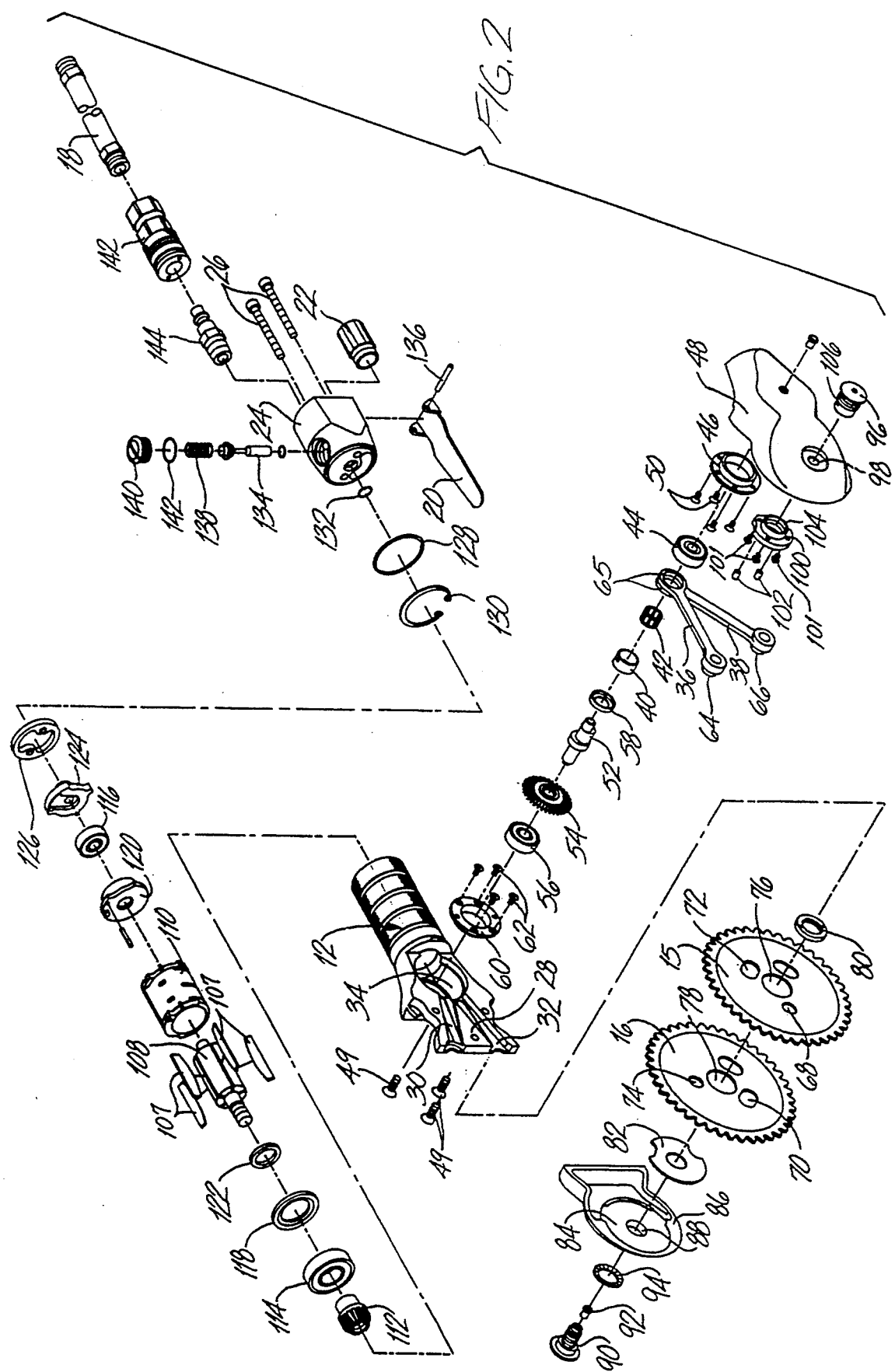
FIG. 2 is an exploded perspective view showing components of a preferred embodiment of the de-hider.
Figure 3:
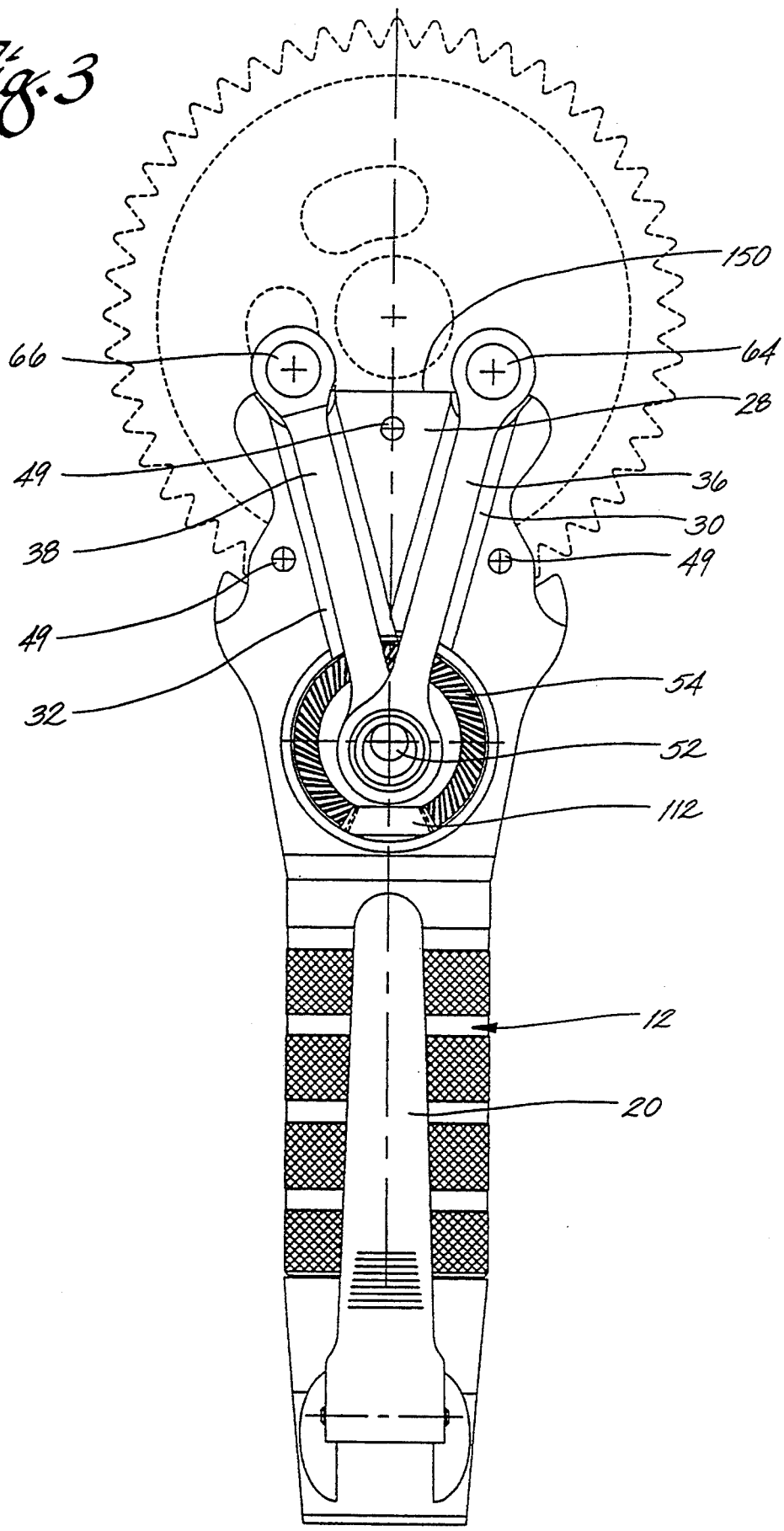
FIG. 3 is an elevational view showing components of the blade drive system.
Figure 4:
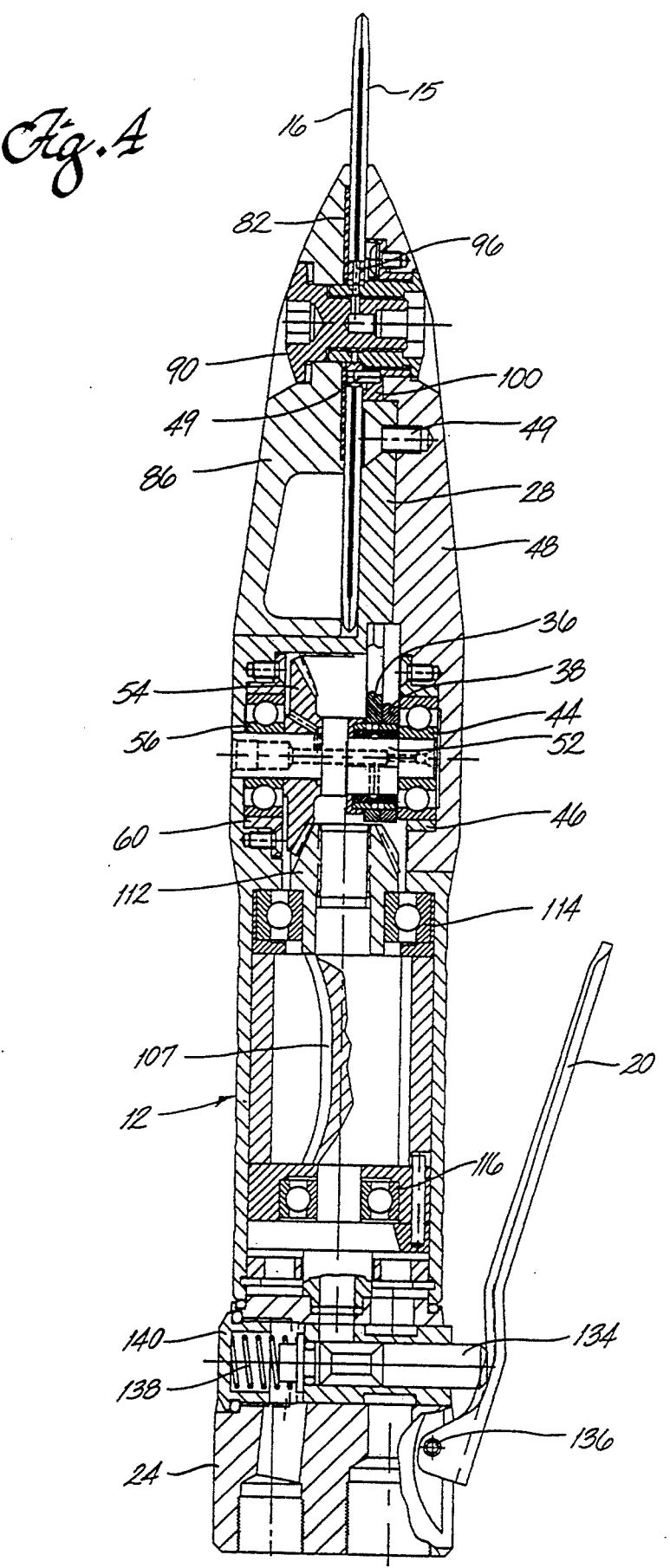
FIG. 4 is a cross-sectional view showing the assembled components of the de-hider.
Figure 5:
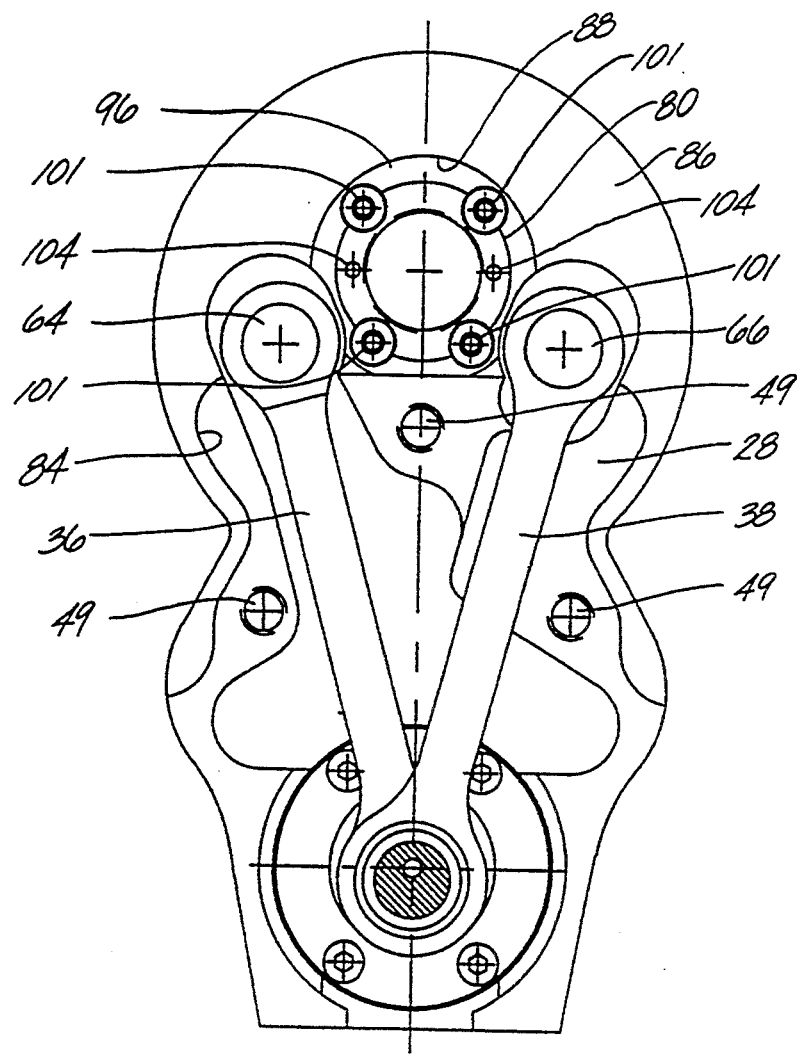
FIG. 5 is an elevational view showing a face of a long blade cover and components of a blade adjustment system carried by the long blade cover.

Referring to the exploded view of FIG. 2, together with FIGS. 3-5, a valve body 24 is attached to the handle section 12 by a pair of fasteners 26. The handle is integrally formed as a one-piece unit with a rigid plate 28 having a pair of grooves 30, 32 formed in a face of the plate. A large circular opening 34 extends through the plate below the grooves. The grooves diverge away from the opening toward the top of plate and terminate at the end of the plate most distant from the handle 12.

The opening 34 through the plate 28 receives an eccentric drive assembly which includes a first drive arm 36 and a second drive arm 38. The first and second drive arms 36, 38 are movably disposed within the grooves 30, 32 of the support plate 28, respectively. Both drive arms have ring-like ends which overlap and are carried on a bearing support which includes a ring-like outer bearing race 40 surrounding an inner roller bearing element 42. The bearing 42 is preferably made of a low-friction plastic material such as Torlon to reduce the shock and vibration from the drive arms during use. A ball bearing 44 is seated in a flanged ring 46 mounted in a recess in a face of a long cover plate 48. Fasteners 49 rigidly secure the long cover plate to the upright plate 28 carried on the handle section. Fasteners 50 secure the flanged bearing ring 46 to the recess in the long cover plate. An eccentric shaft 52 which carries the drive arms is driven by a bevel gear 54 rotatably supported by a ball bearing 56. A cup shaped washer 58 surrounds the ends of the bearing race 40 and the inner roller bearing 42. As shown in FIG. 2, the bearing 44 mounts on one end of the eccentric shaft and abuts against a shoulder. A flanged ring 60 seated in the opening 34 of the plate is secured to a face of the opening by fasteners 62. The ball bearing 56 is supported in the flanged ring 60. The eccentric shaft 52 extends along a common axis of the bevel gear and the bearing 44 and their related ball bearing supports. As shown best in FIG. 4, the entire eccentric assembly which carries the drive arms is supported for reciprocation of the drive arms at one end by the support plate 28 and at the other end by the long cover plate 48.

During use, pins 64 and 66 carried at the ends of the drive arms 36 and 38, respectively, reciprocate within the motor housing. The pin 64 on the first drive arm 36 rotatably fits into a circular opening 68 in the cutting disk 15 while also extending through an oversized opening 70 in the other disk 16. The pin 66 on the second arm extends through an oversized opening 72 in the disk 15 and into a circular opening 74 in the disk 16. Oscillation of the drive arms by the rotating eccentric 52 causes each disk to rotate back and forth and in counter directions with respect to the other disk, in a scissors-like fashion.

The cutting disks have circular central openings 76 and 78 aligned on a common axis. The disks are supported by a ring-like blade spacer 80 which extends into the aligned openings in the disks. The arrangement for supporting the blade spacer 80 is described in more detail below.

Figure 6:
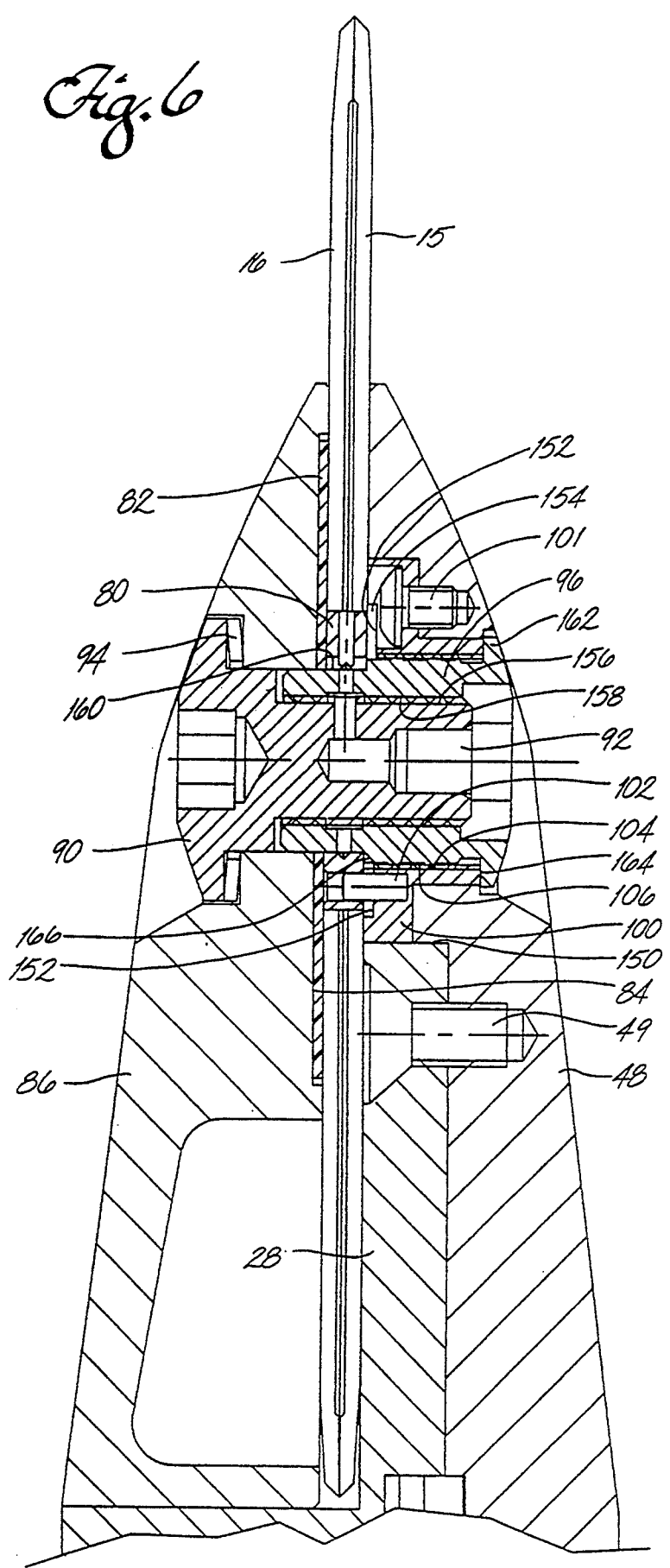
FIG. 6 is an enlarged fragmentary cross-sectional view showing an adjustable cutting blade spacing system in a first extreme position thereof.
Figure 7:
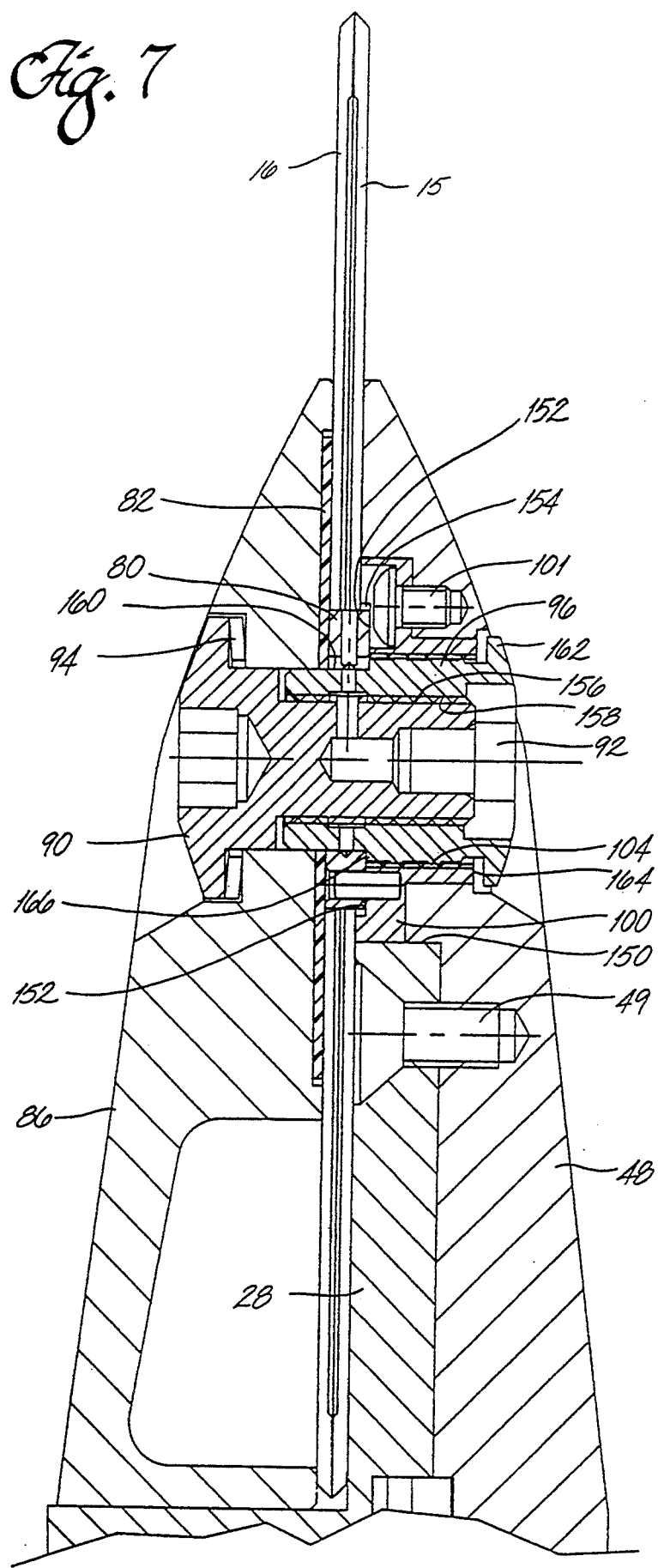
FIG. 7 is an enlarged fragmentary cross-sectional view similar to FIG. 6 but showing the adjustment system in an opposite second extreme position.

A large thin, flat, flexible and generally circular washer 82 made from a low friction material such as Teflon or Torlon is seated in a shallow recess 84 (see FIG. 2) in the face of a short cover plate 86. (The thickness of the washer shown in FIGS. 6 and 7 is exaggerated in size for clarity.) The cover plate includes a central opening 88 for receiving a cover lock screw 90 accessible from the exterior of the cutting tool. The screw 90 and its grease fitting 92 fit through the center of a lock washer 94 seated in a recess in the outer face of the short cover plate 86. The screw 90 fits through the center of the large flat washer 82 and is threaded into an internally threaded opening within a cooperating cover insert 96 which in turn is supported within an opening 98 in the long cover plate 48. A flanged insert support ring 100 located on an opposite face of the long cover plate 48 is secured to the inner face of the long cover plate by fasteners 101 extending through its flange. Roll pins 102 extend through the blade spacer 80 and into the flange of the insert 100 to hold the blade spacer in a fixed, non-rotational position with respect to the flanged insert. The flanged insert 100 has a sleeved portion which is internally threaded at 104 to receive an externally threaded portion 106 of the cover insert 96.

To prevent debris from the cutting process from entering between the two opposing blades, it is essential that the opposing faces of the blades be in intimate pressure contact with each other. In conventional dehiding tools, this is accomplished by providing a wave spring washer which is held in contact with the blades. Since there is direct contact between the wave spring and the face of the blade, the wave spring can wear rapidly at the approximately 6,500 strokes per minute speed at which the tool operates. Thus, the wave spring normally has to be replaced frequently in conventional de-hiding tools. The present invention overcomes this problem by use of the washer disk 82 which is made from the low friction plastic material, the entire flat surface area of which is constantly retained in pressure contact with the face of the blade 16 during use. The large flat blade-contacting face of the washer disk 82 avoids the structural fatigue problems of the prior-art wave spring. The means for maintaining controlled pressure between the washer disk 82 and the blade 16 are described below.

Power for driving the cutting blades 15, 16 is provided by means of the air motor and gear assembly which includes air motor vanes 107 carried on a rotor 108 within a housing 110. The rotor drives a pinion gear 112 engaged with the bevel gear 54. The rotor is supported by ball bearings 114 and 116. The air motor has a front plate 118 and an end cap 120. A spacer ring 122 positions the rotor with respect to the motor front plate. An air supply ring 124 permits introduction of air under pressure into the air motor through a lock ring 126.

The valve body assembly is coupled to the air motor assembly by an O-ring 128 and a retaining C-ring 130. An additional O-ring 132 is located between the valve body assembly and the air motor and gear assembly. The valve body receives a valve stem 134 which extends below the bottom of the valve body for engagement by the lever arm 20. The valve lever rotates around a shaft 136 which in turn is supported from the valve body 24. The valve stem 134 is urged downwardly by a compression spring 138 which is compressed by a combination of a valve plug 140 and an O-ring 142. Upward movement of the valve lever opens the path of air flow from the inlet fitting 18. The inlet fitting is carried on the end of the valve housing 24 by a socket 142 which receives a plug 144 that secures to the valve housing.

The invention includes a blade-spacing adjustment system for adjusting the width of the gap in which the cutting blades are mounted inside the cover plates 48 and 86. As the blades become dull during use, they are periodically removed from the tool and hollow ground to sharpen the cutting edges. The grinding process reduces the wall thickness of the blades, and as they become thinner, a widened gap between them can lead to cutting deficiencies in a manner similar to cutting with scissors having their blades spaced too far apart. The adjustment system provided by the invention allows the blade gap width to be adjusted during use to move the blades closer to one another to compensate for the blade wall thickness being reduced by the hollow grinding process. The blade gap adjustment provides a simultaneous pressure adjustment system that constantly applies face-to-face pressure to the cutting blades to compensate for changes in their wall thickness. The face-to-face blade pressure can be adjusted at any time, whether or not the blades have been removed and ground to a thinner dimension.

FIG. 6 shows a first extreme position of the blade adjusting system in which the blades 15 and 16 are of maximum wall thickness. The adjustment system is shown in this view prior to making any adjustments to compensate for changes in blade thickness. FIG. 7 shows the adjustment system in a second and opposite extreme position in which the full amount of blade position adjustment has been made to compensate for a reduced wall thickness of the blades.

Referring to the FIG. 6 arrangement of the blade adjustment system components, the long cover 48 and the short cover 86 extend over a top edge 150 of the plate 28 that carries the slotted grooves 30 and 32 and their corresponding cutting blade drive arms. The cutting blades 15, 16 are joined together face-to-face by a mounting and adjustment system that bridges the two blade covers and is spaced above the extreme top edge 150 of the upright supporting plate 28. This provides a stable and structurally sound means of support for the blades, as described in more detail below.

The blade spacer 80 comprises a ring-like bushing which extends through the aligned central holes 76, 78 of the cutting blades to support the blades in a gap between the long and short blade covers. The roll pins 102 which hold the blade spacer 80 to the flanged insert 100 prevent relative rotation between the blade spacer and the insert. The roll pins 102 also provide a means for guiding travel of the blade spacer toward or away from the flanged insert. FIG. 6 shows the blade spacer 80 in the extreme first position spaced a maximum distance from a recessed face 152 of the flanged insert.

This view shows an undercut 154 of the flanged insert into which the blade spacer can travel during adjustment. FIG. 7 shows the opposite extreme second position in which the blade spacer has moved fully into the undercut and against the recessed face 152 of the flanged insert.

The cover screw 90 has an externally threaded shaft 156 which threads into the internally threaded sleeve 158 of the cover insert 96. A cylindrical exterior wall 160 of the sleeve 150 on the cover insert extends through the center of the spacer ring 80. This provides a bearing surface for the in and out travel of the spacer ring 80 along the outer surface of the sleeve. The cover insert 96 has its externally threaded shaft 106 threaded into the internally threaded sleeve 104 of the flanged ring 100. In the extreme first adjustment position shown in FIG. 6, the cover insert 96 is threaded into the flanged ring 100 with a flanged head 162 of the insert tightened against an annular end 164 of the flanged ring. The transition between the threaded portion 106 of the cover insert 96 and the smooth outer cylindrical wall section 160 of the insert forms an annular shoulder 166 of the insert against which the spacer ring 80 applies pressure when the inside faces of the blade covers are pressed against the outer faces of the blades. When the cover screw 90 is threaded into the cover insert 96, the head of the cover screw applies pressure through the lock washer 94 and this pressure is applied by the large low-friction washer 82 to the outer face of the cutting disk 15. In this position, the adjustment system adapts to the maximum thickness of the blades 15, 16, with the blade spacer 80 being aligned with the face of the long cover 86, leaving the undercut space 154 open to later receive travel of the spacer 80 to adapt to a narrowing adjustment of the blade gap.

In order to compensate for reduced blade thickness, such as from hollow grinding of the blades, the gap between the blade covers can be narrowed to the position shown in FIG. 7. To make a blade adjustment, the screw 90 is first backed off by rotating it approximately one quarter of a turn to loosen it, and the cover insert 96 is then rotated away from the blades 15, 16 which, in effect, moves the shoulder 166 of the insert 96 away from the undercut space 154. The screw 90 is then tightened, which pushes the spacer 80 into the undercut. By further tightening of the screw, pressure is applied by the short cover plate face and the low-friction washer 82 to apply pressure to the faces of the cutting blades. The pressure from moving the short cover plate is resisted by the fixed position of the long cover plate. The spacer ring 80 does not rotate during its inward travel into the undercut because of the fixed roll pins 102 which resist such movement. However, the spacer ring is able to travel into the fixed flanged insert 100 along the axis of the roll pins when the adjustment is made.

Thus, the tool can be adjusted to compensate for changes in blade thickness, as mentioned, but in addition, the spacing between the blades also can be adjusted at anytime to compensate for improper blade face pressure that reduces the desired scissors action of the blades. For instance, if the user notices that the blades are "grabbing" rather than cutting smoothly, the blade face pressure can be adjusted by adjusting the screw 90 and the cover insert 96 to narrow the blade gap for thereby moving the blade faces closer together and into greater pressure contact. This can alleviate the cutting problem by restoring the smooth scissors action of the blades. It also avoids the problem of the operator sometimes disassembling the tool to have the blades resharpened when the adjustment in face-to-face pressure contact is all that is necessary.

The invention is particularly useful in avoiding the prior art use of the wave spring or similar means of maintaining pressure on the cutting blades. Because of the adjustable means of controlling the width of the gap between the blades each time the spacing is reduced by the adjustment, a controlled pressure can be applied continually to the faces of the blades during use. Since the pressure is applied through surface contact from the large low-friction disk 82 rather than a wave spring, the invention avoids the wear and fatigue failure normally associated with such a spring.

The invention also greatly reduces the amount of time normally associated with prior art de-hiding tools in replacing the spring means of applying pressure to the faces of the disks or to disassemble the disks for sharpening the edges.

The invention also provides an improved means of support for the blades. As shown best in FIGS. 6 and 7, the blade supporting shaft (the screw 90 and the cover insert 96) extend from cover to cover over the top edge 150 of the frame 28 that supports the covers. Both ends of the blade support shaft extend entirely through the cover plates, and, as mentioned, are accessible entirely from outside the blade covers. This arrangement maximizes the structural supporting mass available from the blade covers to support the blade support shaft. This provides an improvement over the prior art use of a thin upright supporting wall which is more prone to fracture or breakage from applied lateral blade forces during use. The blade supporting shaft also provides a stable support that is supported rigidly at both ends in a manner similar to a bridge, as opposed to the prior art cantilevered means of support which is also more prone to breakage from the applied forces during use.

The roller bearing 42 which is carried upon the eccentric shaft 52 for the drive arms is preferably made from a low-friction material such as Torlon. This bushing reduces vibration by cushioning the strokes of the drive arms and has a longer wear life than a needle bearing.

FIGS. 8 through 11 illustrate an alternative embodiment of the invention which includes a modified blade adjustment system used to compensate for changes in blade thickness and to adjust blade pressure. For simplicity, components of the alternative embodiment which are similar to components in the embodiment of FIGS. 1 through 7 are shown in FIGS. 8 through 11 with the same reference numerals along with a prime (') notation. Components which are modified are identified with separate reference numerals.

Figure 8:
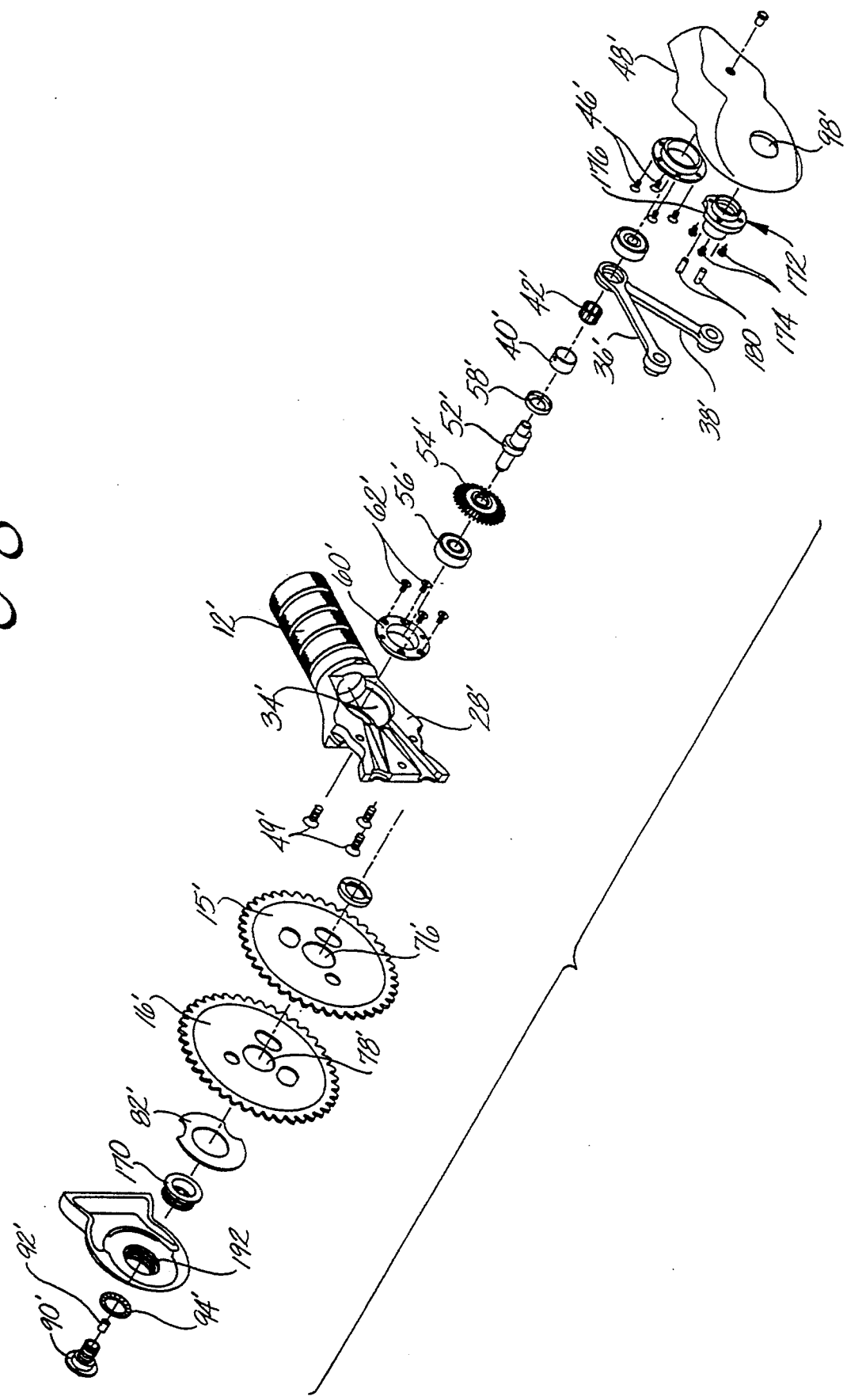
FIG. 8 is an exploded perspective view showing a partial set of components of an alternative embodiment of the de-hider.

FIG. 8 is an exploded perspective view showing a partial set of components of the alternative de-hiding tool which includes a cover insert 170 that adjustably mounts in the opening 192 of the short cover plate 86'. Components shown in FIG. 1, but omitted from FIG. 8, are virtually identical in the embodiment of FIG. 8. The locking screw 90' passes through a hole in the cover insert 170 and fastens to an internally threaded passage in the flanged insert support ring 172 as described in more detail below. On the opposite side of the alternative de-hiding tool, a flanged insert support ring 172 is affixed in the opening 98' of the long cover plate. The flanged insert support ring 172 is rigidly affixed in the opening 98' by a set of fasteners 174 extending through a flange 176 on the ring 172. A ring-like blade spacer 178 (shown in FIGS. 9 and 10) projects from a face of the flange 176. A pair of pins 180 extend through the blade spacer and into the flange 176 of the ring to hold the blade spacer on the long cover plate in a fixed non-rotational position with respect to the flanged portion of the support ring.

Figure 9:
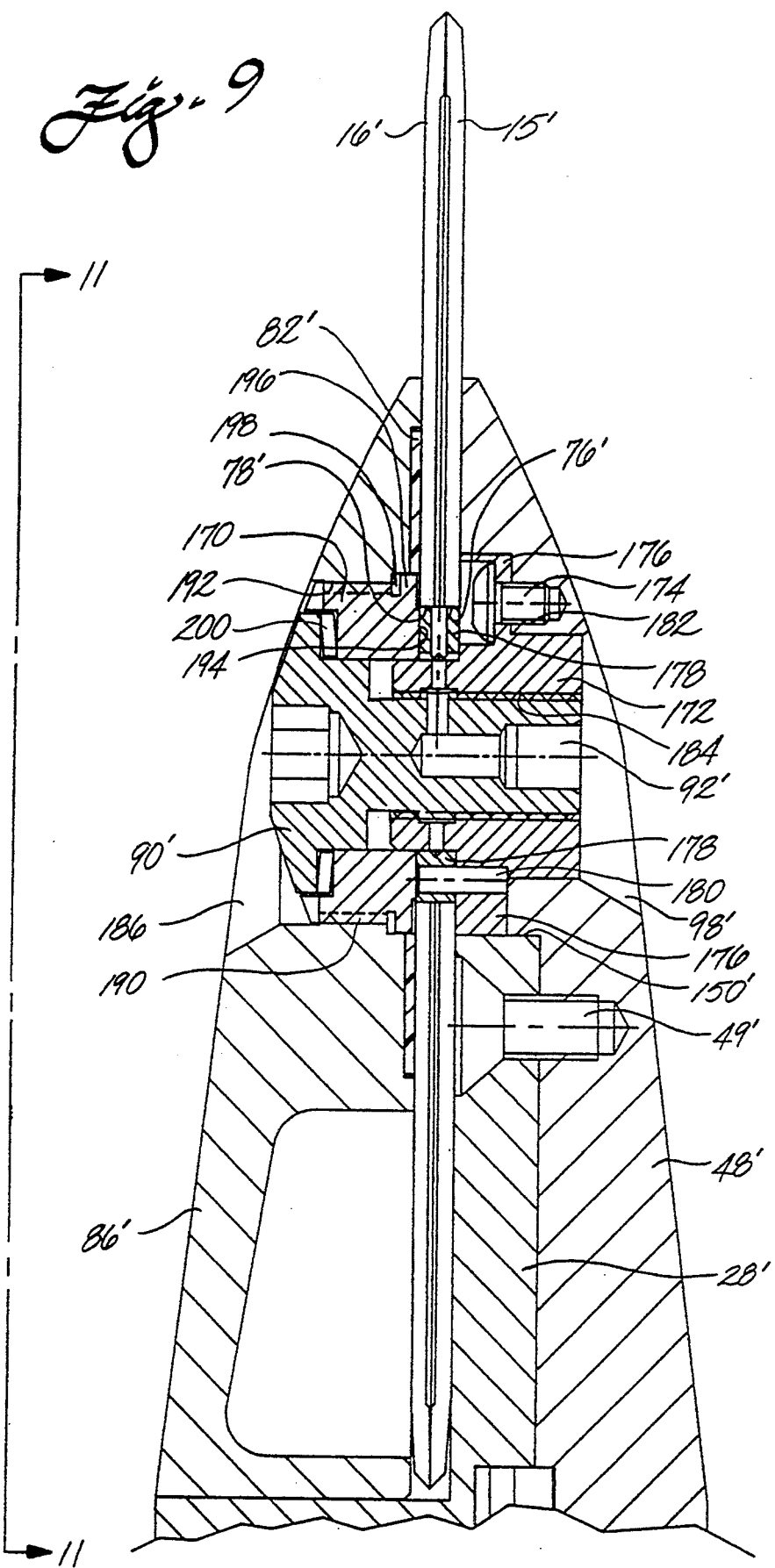
FIG. 9 is an enlarged fragmentary cross-sectional view of the alternative embodiment showing a blade spacing and adjustment system in a first extreme position.
Figure 10:
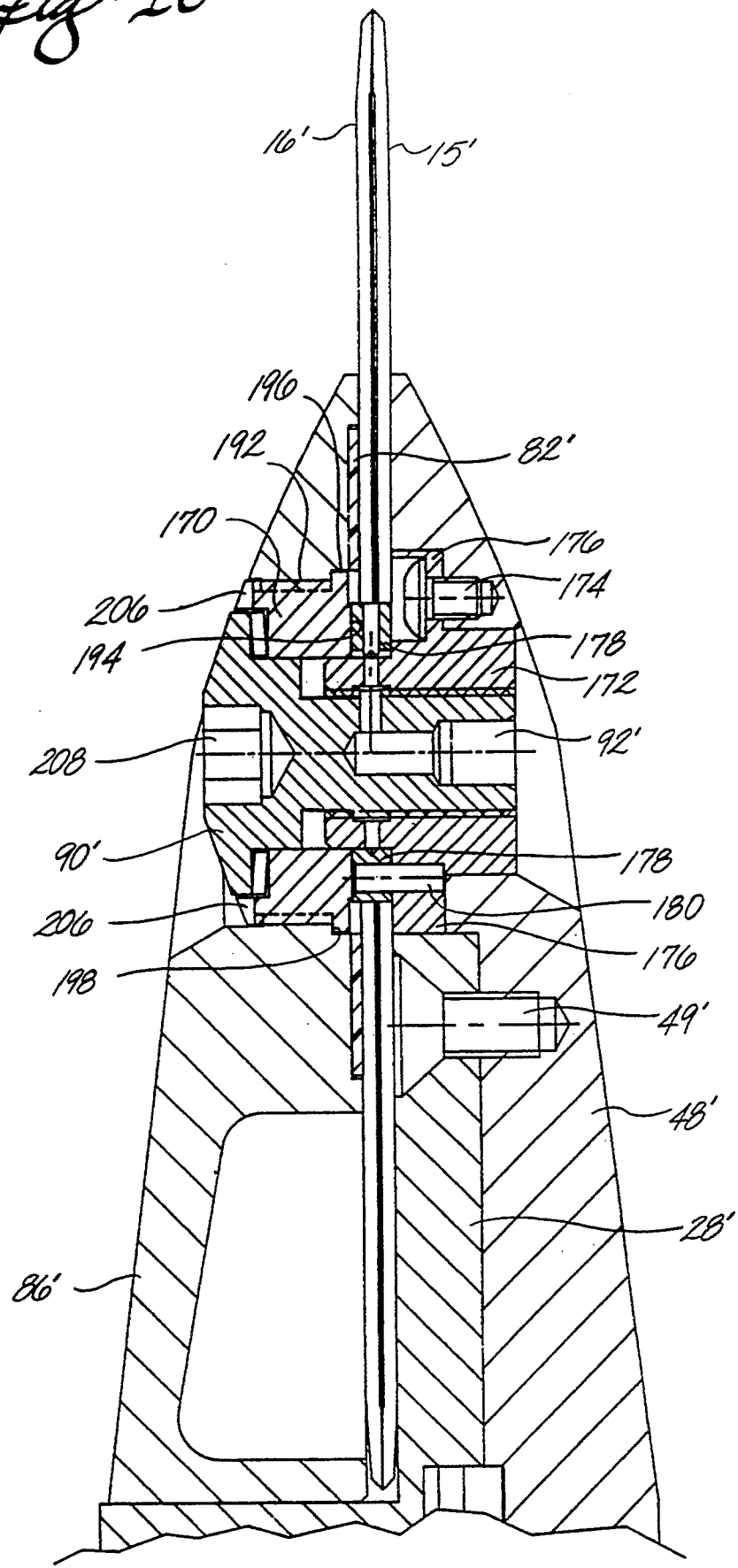
FIG. 10 is an enlarged fragmentary cross-sectional view similar to FIG. 9 but showing the adjustment system in an opposite second extreme position.
Figure 11:
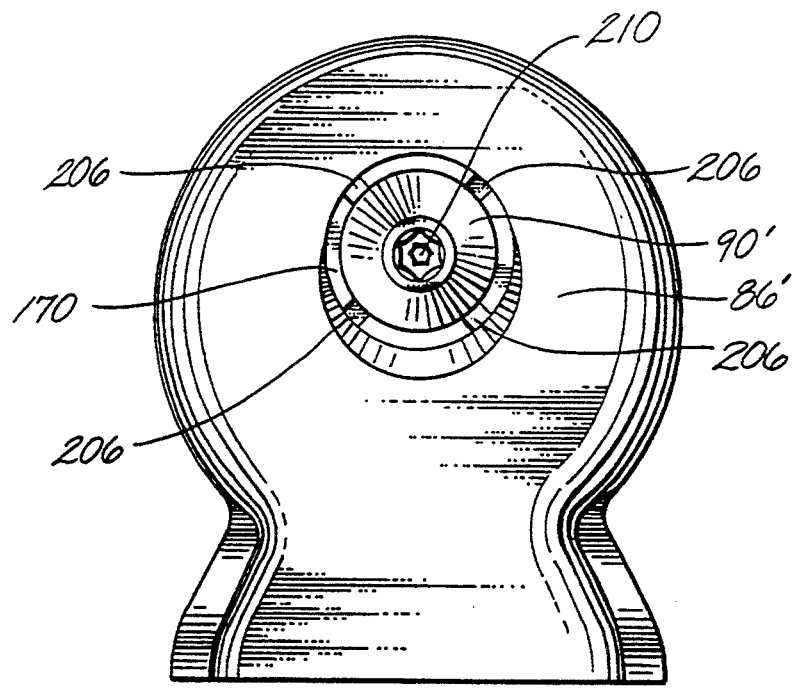
FIG. 11 is a front elevational view taken on line 11—11 of FIG. 9 and showing the adjustment means provided by a cover insert and locking screw in a short cover plate of the alternative embodiment.

FIG. 9 shows a first extreme position of the alternative blade adjusting system in which the blades 15' and 16' are of maximum wall thickness. The adjustment system is shown in this view prior to making any adjustments to compensate for changes in blade thickness or blade pressure. FIG. 10 shows the adjustment system in a second and opposite extreme position in which the full amount of blade position adjustment has been made to compensate for a reduced wall thickness of the blades.

Referring to the FIG. 9 arrangement of the blade adjustment system components, the long cover plate 48' and the short cover plate 86' extend over a top edge 150' of the supporting plate 150' that carries the slotted grooves for receiving the corresponding cutting blade drive arms. The cutting blades 15', 16' are joined together face-to-face by the alternative mounting and adjustment system that bridges the two blade covers and is spaced above the extreme top edge 150' of the upright supporting plate 28'. As with the embodiment of FIGS. 1 through 6, this mounting system provides a stable and structurally sound means of support for the blades.

The blade spacer 178 comprises a ring-like bushing which extends through the aligned central holes 76', 78' of the cutting blades to support the blades in a gap between the long and short blade covers. The pins 180 which hold the blade spacer to the flanged insert 176 prevent relative rotation between the spacer and the insert. The fasteners 174 extend through a flanged portion 176 of the support ring 172 and are threaded into corresponding bores 182 in a recessed inside face of the long cover plate. This holds the support ring in a fixed position within the exterior opening 98 of the long cover plate. An internally threaded bore 184 extends through the center of the support ring, aligned on a common axis between the openings through the long and short cover plates. On the opposite side of the tool, the locking screw 90 is threaded into the bore 184. This positions the bearing-like blade spacer 178 in a fixed position in the center of the gap between the cover plates for supporting the cutting blades in the gap.

The locking screw or threaded fastener 90' extends through an exterior opening 186 in the short cover plate and has its threaded shank fastened into the internally threaded bore 184 of the support ring 172. The threaded fastener 90' also extends through a central bore in the cover insert 170 which in turn is fastened in the exterior opening 186 of the short cover plate. The cover insert 170 has an externally threaded outer surface 190 that fastens into an internally threaded bore 192 that surrounds the opening 186 in the short cover plate. The cover insert 170 also includes a pressure applying face 194 for applying pressure to an adjacent face of the blade spacer 178. The cover insert 170 further includes a flanged inner face 196 aligned adjacent to an undercut 198 formed in an inside face of the short cover plate at the end of threaded bore 192. Adjustment of the cover insert 170 by rotating it about its axis can move the flanged portion 196 of the cover insert laterally along the axis of the cutting blade support members into the undercut 198.

The fastener 90' locks the cover insert in the position shown in FIG. 9 for applying pressure to the faces of the cutting blades. The fastener 90' is threaded into the bore 184 of the support ring 172 and tightened against a lock washer 200 in the outside face of the cover insert 170.

Figure 12:
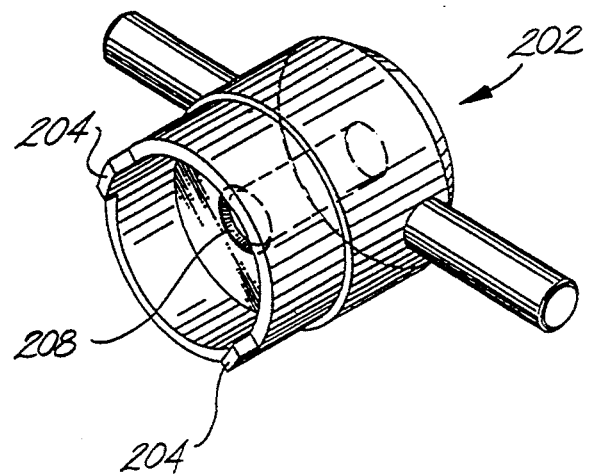
FIG. 12 is a perspective view showing an adjustment tool used for making adjustments of the system shown in FIGS. 8-11.

In order to compensate for reduced blade thickness, such as from hollow grinding of the blades, or from wear that occurs during use (in which case the blade pressure needs to be increased), the gap between the blade covers can be narrowed to the position shown in FIG. 10. To make such a blade adjustment, the fastener 90' is backed off approximately ¼ of a turn to loosen it, and the cover insert 170 is then rotated away from the blades which, in effect, moves the flanged shoulder 196 of the cover insert into the undercut 198 on the inside face of the short cover plate. In the embodiment of the adjustment system shown in FIGS. 8 through 11, adjustments in the width of the gap in which the cutting blades are mounted can be made manually using one hand while the other hand is used to hold the entire de-hiding tool. These adjustments are both made from the same side of the tool, i.e., from the short cover plate side of the tool. As shown best in FIGS. 11 and 12, a spanner wrench 202 is used to move the cover insert 170 outwardly by rotating it in the threaded bore 192 of the short cover plate. The spanner wrench includes detents 204 on opposite sides which fit into corresponding slotted grooves 206 in the front face of the cover insert. While the spanner wrench and its detents fit circumferentially around the fastener 90' an Allen wrench (not shown) can be inserted through a central passage 208 in the spanner wrench to provide access to a cooperating Allen wrench hole 210 in the exposed front face of the fastener 90'.

In use, the Allen wrench is inserted through the passage in the spanner wrench and used to rotate the locking screw 90' away from the blades to loosen it so as to allow the spanner wrench to then be used to rotate the cover insert 170, thereby moving the flanged portion 196 of the cover insert into the undercut 198 and away from the cutting blades. FIG. 10 shows the flanged portion 196 of the cover insert 170 in its extreme position moved axially its full distance of travel into the undercut where the flange 196 abuts against an inside face of the short cover plate adjacent the threaded bore 192. Moving the cover insert laterally toward the undercut in this manner allows the gap that retains the cutting blades to be narrowed by causing the short cover plate to move a selected distance toward the blades. The blade spacer 178 that supports the blades moves into the undercut and therefore has its effective width reduced by the adjustment. The locking screw 90' is then tightened against the outside face of the cover insert 170, using the Allen wrench. This locks the inside face of the cover insert 194 against the face of the blade spacer 178 and applies pressure by the short cover plate and the Teflon disk 82' against the faces of the cutting blades. The pressure from moving the short cover is resisted by the fixed position of the long cover.

Thus, by moving the cover insert and blade spacer into the undercut, the adjustment system is able to compensate for reduced blade thickness by reducing the effective width of the gap in which the blades are mounted. The entire adjustment can be easily made using one hand by simply adjusting the locking screw 90' with the Allen wrench while drawing the cover insert 170 outwardly with the spanner wrench both on the same side of the de-hiding tool.

Thus, the present invention provides a de-hiding tool with improved wear resistance, avoidance of tool breakage, reduced vibration, reduced down time required for reconditioning the cutting blades, and increased efficiency in making adjustments in blade pressure during use.

What is claimed is:

1. A de-hiding tool comprising:

a pair of cutting blades, an elongated handle section containing an air motor for connection to a source of air under pressure, a rigid upright cover supporting plate carried on the handle section, the cover supporting plate having an air motor drive arm bearing support and having a top edge above which the pair of cutting blades are supported, a first blade cover rigidly affixed to the cover supporting plate and extending above the top edge thereof, the first blade cover having an inside face spaced above the top edge of the cover supporting plate and having an opening extending entirely through the first blade cover above said top edge, a second blade cover mounted above the handle section and extending above the top edge of the cover supporting plate, the second blade cover having an inside face facing toward the inside face of the first blade cover so the inside faces of the blade covers confront one another on opposite sides of a gap in which the cutting blades are mounted, the second blade cover having an opening extending entirely through it in alignment with the opening through the first blade cover, a blade supporting shaft extending through the aligned openings in the first and second blade covers so that the shaft is rigidly supported by the blade covers and is spaced above the top edge of the cover supporting plate, and blade mounting means carried on the blade supporting shaft to support the pair of cutting blades on the shaft in the gap between the confronting inside faces of the first and second blade covers, the air motor including drive arms mounted on said bearing support and connected internally to the cutting blades for driving the blades in an oscillating and counter-rotating fashion while the blades are supported on the mounting means of the blade supporting shaft.

2. Apparatus according to claim 1 in which the blade supporting shaft is accessible from the exterior of the first and the second blade covers.

3. Apparatus according to claim 1 in which the blade mounting means includes a blade spacer bushing movable laterally with respect to the plane of the blades under an external adjustment of the supporting shaft to reduce the effective width of the blade spacer and thereby controllably adjust the width of the gap in which the cutting blades are mounted.

4. Apparatus according to claim 3 including a low friction washer having a flat inside face disposed against one of the cutting blade faces and supported by one of the blade covers for applying surface area pressure against one of the cutting blades in response to controlled adjustment of the effective width of the blade spacer bushing.

5. Apparatus according to claim 1 in which the blade supporting shaft comprises a cooperating threaded shaft and threaded sleeve both accessible from the exterior of the blade covers to rotate the shaft and sleeve relative to each other by access gained solely from the exterior of the blade covers.

6. Apparatus according to claim 5 in which the sleeve and shaft are supported by and accessible solely by one of said blade covers.

7. In a de-hiding tool of the type having an elongated handle section containing an air motor for counter-rotating a pair of disk-like cutting blades with an oscillating motion at high speeds, in which the air motor drives a pair of drive arms for rotating the cutting blades, and in which the cutting blades are mounted in a gap between a pair of blade covers carried on the handle section, the improvement comprising an elongated support member mounted in a fixed position to at least one of the blade covers, a bearing mounted on the support member to support the blades for rotation in the gap between the blade covers, a first adjustment means moveable relative to the bearing and accessible from outside the blade covers to move one of the cover plates relative to the bearing to an adjusted position so as to reduce the effective width of the bearing that supports the cutting blades, and a second adjustment means engaged with the first adjustment means and accessible from outside the blade covers to releasably lock the first adjustment means in said adjusted position, said first adjustment means producing relative travel between the blade covers to reduce the width of the gap to accommodate for the adjustment in the effective width of the bearing.

8. Apparatus according to claim 7 in which the first and second adjustment means includes a cooperating threaded shaft and threaded sleeve exposed to the same exterior side of one of the blade covers, and in which relative rotation of the shaft and sleeve causes one blade cover to move toward the other which moves the blade support bearing into a space within the interior of one of the blade covers to reduce effective width of the bearing and the width of the gap in which the blades are mounted.

9. Apparatus according to claim 8 in which the space is in the same blade cover on which the threaded shaft and sleeve are mounted.

10. Apparatus according to claim 7 in which the first adjustment means comprises a threaded support insert held in an adjustable position within one of the blade covers, and the second adjustment means comprises a threaded shaft secured to the threaded insert and held in an adjustable position within the same blade covers, and in which the first adjustment means is adjusted by rotation of the insert relative to the threaded shaft and the second adjustment means provides an adjustment by rotation of the threaded shaft relative to the threaded insert.

11. Apparatus according to claim 10 in which the blade support bearing is movable into an undercut space within the insert to reduce the effective width of the blade support bearing, said travel of the bearing into the undercut space being produced by relative rotation of the threaded shaft and the insert.

12. A de-hiding tool comprising:

a pair of cutting blades, an elongated handle section containing an air motor for connection to a source of air under pressure, a first blade cover carried by the handle section for extending upwardly along one side of the pair of cutting blades, the first blade cover having an inside face for facing toward the cutting blades and having an opening extending entirely through the first blade cover, a second blade cover carried above the handle section and having an inside face facing toward the inside face of the first blade cover and having an opening extending entirely through the second blade cover in alignment with the opening through the first blade cover, a support member secured in the opening of the first blade cover and having a passage aligned with an axis through the center of the cutting blades, a locking screw secured in the opening of the second blade cover and having a shaft extending through and secured in the passage of the support member so that the locking screw and support member form a blade supporting shaft for the cutting blades while the two blade covers are secured in a fixed confronting position with respect to each other with a gap extending between them for receiving the mounted cutting blades, an adjustable blade support member carried by the blade supporting shaft to support the pair of cutting blades in the gap between the confronting inside faces of the blade covers, a blade cover insert adjustably secured to the opening in the second blade cover and adjustably secured to the locking screw for holding the blade support member in a first position with the gap in a widened position in which the blade covers apply pressure to the faces of the blades when the blades are mounted in the widened gap, the locking screw retaining said blade cover insert in the first widened position, the blade cover insert being movable with respect to the second blade cover toward an undercut space inside in the second blade cover, and adjustment means on the locking screw and the blade cover insert accessible from the exterior of the blade covers for moving the blade support member into the undercut space to narrow the gap to a second narrowed position in which the cutting blades are mounted for operation while the insides of the blade covers continue to apply pressure to the faces of the cutting blades.

* * * * *

UNITED STATES PATENT AND TRADEMARK OFFICE
CERTIFICATE OF CORRECTION

PATENT NO. : 5,441,445
DATED : August 15, 1995
INVENTOR(S) : Ralph K. Karubian; Thomas G. Surman It is certified that error appears in the above-indentified patent and that said Letters Patent is hereby corrected as shown below:

```
Column 2, line 65, after "wear," delete "or".
Column 4, line 29, before "plate" insert --the--.
Column 7, lines 32,33, change "long cover 86" to
          -- long cover 48 --.
Column 7, line 60&67, change "scissors" to -- scissor --.
Column 9, line 19, delete "150'" and substitute therefor
          -- 28' --.
Column 9, line 44, change "screw 90" to -- screw 90' --.
Column 11, line 32, before "having" insert -- also --.
```

Signed and Sealed this

Fifth Day of March, 1996

Attest:

BRUCE LEHMAN

*Attesting Officer*     Commissioner of Patents and Trademarks